United States Patent [19]

Coleman

[11] Patent Number: 5,370,884
[45] Date of Patent: Dec. 6, 1994

[54] COMBINATION SUCKER AND EDIBLE POWDER

[75] Inventor: Thomas J. Coleman, Bristol, Va.

[73] Assignee: B.A.A.T. Enterprises Inc., Bristol, Va.

[21] Appl. No.: 198,347

[22] Filed: Feb. 18, 1994

[51] Int. Cl.⁵ .................. A23G 3/00; A23G 3/24; B65D 81/32
[52] U.S. Cl. .................. 426/112; 426/110; 426/115; 426/120; 426/134; 426/91; 426/289; 401/123; 401/126; 118/13
[58] Field of Search ............... 426/112, 115, 120, 134, 426/91, 110; 401/123, 124, 126; 118/13, 26, 23

[56] References Cited

U.S. PATENT DOCUMENTS

| | | | |
|---|---|---|---|
| 1,718,997 | 7/1929 | Burt | 426/91 |
| 1,889,882 | 12/1932 | Woods | 426/112 |
| 1,983,685 | 12/1934 | Townsley | 426/112 |
| 2,647,681 | 8/1953 | Paoli | 426/112 |
| 2,824,010 | 2/1958 | Pederson | 426/115 |
| 2,832,981 | 5/1958 | Breuhan | 401/126 |
| 3,386,792 | 6/1968 | Ireland | 401/126 |
| 3,413,128 | 11/1968 | Steinbarth et al. | 426/115 |
| 3,431,041 | 3/1969 | Fontlladosa | 426/115 |
| 5,077,050 | 12/1991 | Wall | 426/115 |

FOREIGN PATENT DOCUMENTS 788263 12/1957 United Kingdom ............... 401/124

Primary Examiner—Steven Weinstein
Attorney, Agent, or Firm—Melvin L. Crane

[57] ABSTRACT

The combination candy sucker and edible powder is a novelty candy holding device designed for the combination of a hard sucker type candy with a powder or granular candy in a self contained housing. The holding device has two parts. The top cap has a hard sucker type candy and the plastic housing contains the powder or granular candy. After removing the top cap, the hard candy is moistened and then dipped into the powder or granular candy. The sucker is then covered with the powder or granular candy giving a different and unique taste for children to enjoy.

6 Claims, 1 Drawing Sheet

COMBINATION SUCKER AND EDIBLE POWDER

This invention is directed to a pop or sucker and more particularly to an edible powder into which the sucker can be dipped. The powder candy can be formed of one or a plurality of flavors which can be consumed along with the sucker after the sucker has been dipped into the powder. The powder may be sugar based with different flavors. The sucker is wetted and then dipped onto the powder so that the powder adheres to the sucker to form a coating on the surface of the sucker such as frosting on a cake. The powder is contained within a hollow holder and when the sucker has become wet and dipped into the powder, a coating forms on the sucker so that in use a person will not only enjoy the taste of the sucker but rather the coating and the sucker.

It is therefore an object of the invention to provide a powder holding device in combination with a sucker holding device so that a person will have access to a sucker and a powder coating for coating the sucker to present a sucker with one or more flavors for use by a person.

Another object is to provide a powder for a sucker whereby the flavor of the sucker can be changed by use of the powder.

Still another object is to provide a combination sucker and powder whereby the powder can be one or a plurality of mixed flavors whereby the flavor of the sucker can be changed by use of a plurality of flavors.

Yet another object is to provide a combination sucker and edible powder whereby one may consume the sucker alone or dip the sucker into the powder to change the flavor of the sucker.

Another object is to provide a separable housing so that the sucker may be removed from the powder container and only the sucker consumed by the person.

Other objects and uses will come to those skilled in the art and the invention can be practiced other than as specifically described.

DETAILED DESCRIPTION

Figure 3:
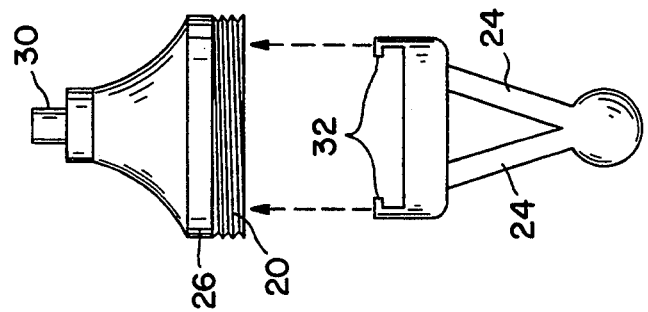
FIG. 3 illustrates a modification of the device shown in FIG. 1.
Figure 2:
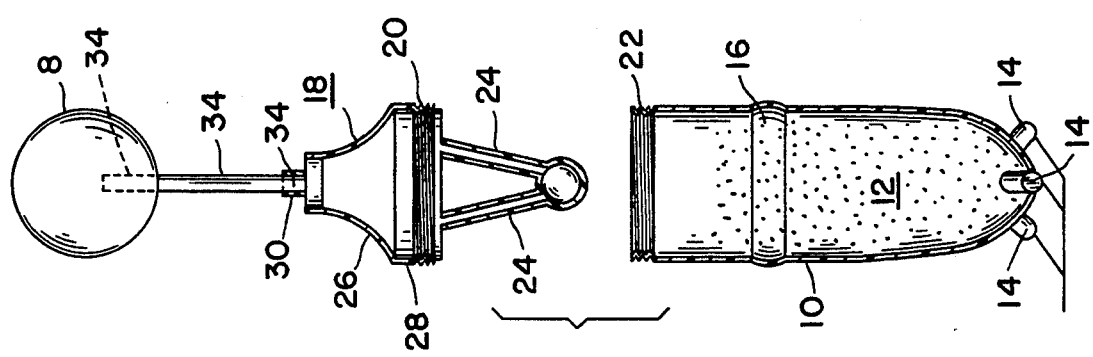
FIG. 2 illustrates a cross sectional view of the sucker and powder candy holder.
Figure 1:
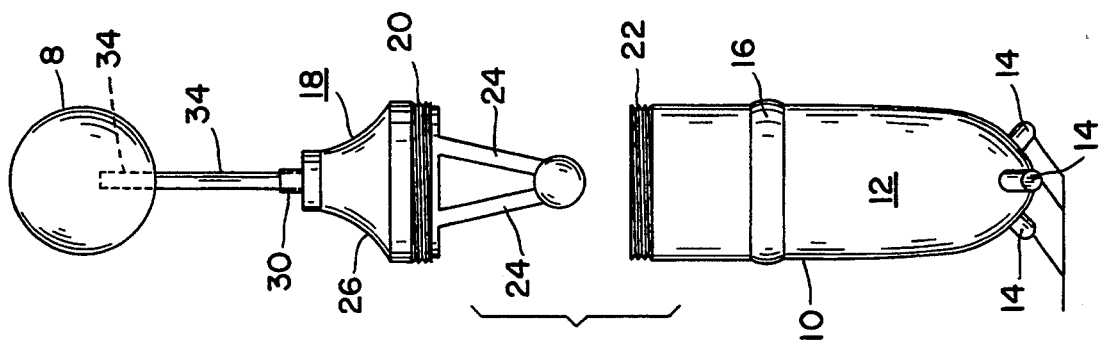
FIG. 1 illustrates the combination sucker and edible powder candy device shown with the sucker holder separated from the powder candy holder.

Now referring to the drawings wherein like reference characters represent like parts throughout the disclosure, there is shown a combination sucker 8 and edible powder 12 by which the flavor of the sucker can be changed by the edible powder. As shown, the device includes a two part housing, an upper portion and a bottom portion. The bottom portion includes a reservoir section 10 made of plastic or any other type of material within which the edible candy powder 12 or edible fine granular candy is placed. The reservoir is shown with feet 14 at its bottom which can serve to stand the device in an erect position. The reservoir is shown with an enlarged mid-section or ring 16 about the body of the reservoir which assists in holding the device in ones hand. Secured to the reservoir is the upper portion which includes a candy sucker holder 18 which has a slip joint or is screw threaded to the reservoir by mating screw threads 20, 22 or by any other suitable means such as a bayonet type joint. The candy sucker holder is shown with a handle 24 which extends downwardly from a main body 26 by which one can hold the sucker in a situation when not secured to the reservoir. The handle 24 can be fixed to the main upper body as shown in FIG. 1, or the handle may be provided with hook ends 32 in order to connect the handle to indentations in the main upper body. When secured to the reservoir, the handle extends into the reservoir. The main body 26 can be of any shape; however, it is shown as a top which reduces from an outer portion 28 the size of the reservoir down to a smaller end portion 30. The smaller end portion is provided with an aperture into which one end of a sucker stick 34 protrudes in order to secure the sucker to the main body. The sucker has a diameter smaller than the inside diameter of the reservoir so that the sucker can be inserted into the reservoir in order to coat the sucker with the powder contained in the reservoir.

In use, a flavored powder of fine granular candy is placed in the reservoir. The candy sucker is wetted or moistened by some means and placed into the reservoir in contact with the candy powder. Since the sucker is wet some of the candy powder will adhere to the sucker and the sucker is removed from the reservoir and the main body for the sucker is attached to the reservoir. The candy sucker is then ready for use with the flavor of the sucker changed by the flavor of the candy powder. The sucker is used in the normal manner and when desired to change the flavor, the sucker is again dipped into the reservoir to collect some of the candy powder. If one plans on consuming a large portion of the sucker and candy powder continuously, the main body portion for the sucker need not be reattached to the reservoir so that the sucker can be dipped into the reservoir, as desired.

In preparation for sale the candy powder is placed in the reservoir and the sucker holder is fastened to the reservoir with a sucker attached therein. Then a wrapper is provided to cover the entire combination or just the candy sucker. It would be obvious to one skilled in the art that the candy powder or granules can be a mixture of different flavors in the reservoir or the reservoir could include separate sections of candy powder in which each section would be a different flavor. The invention is not bound by any particular flavors nor any particular mixture of flavors. Further the sucker can be of any flavor and if desired one flavored sucker could be exchanged for a different flavored sucker by removing and replacing the sucker and sucker stick. The sucker stick should have a length sufficient for the sucker to reach the bottom of the reservoir in case the candy powder becomes considerably consumed, and the reservoir should have an opening diameter which is sufficiently large to receive the sucker in order to coat the sucker with the edible flavored powder. Further it would be obvious that the two-part housing could be sold without the sucker and the sucker sold separately for use with the two-part body. Also the powder could be sold separately and poured into the reservoir when in use.

I claim:

1. A combination comprising a candy sucker adhered to one end of a support stick holder, a housing, and either an edible flavored powder or fine granular particles of flavored candy contained in said housing, said edible flavored powder or fine granular particles capable of being added onto the outer surface of the sucker in order to provide a different flavored sucker, said housing comprising a bottom housing portion and an upper housing portion, said bottom housing portion comprising a closed bottom end with an open upper end forming a reservoir that contains said edible flavored powder or fine granular particles of flavored candy, said upper housing portion being releasably secured to said bottom housing portion to open and close said bottom housing portion, said upper housing portion having an aperture on an upper surface releasably securing a free end of said support stick holder for supporting said candy sucker on said upper portion of said housing, and said bottom housing portion having a diameter sufficiently large to receive said sucker such that said candy sucker can be dipped into said edible flavored powder or fine granular particles of flavored candy in said reservoir to coat said candy sucker and change the flavor of said sucker.

2. The combination as set forth in claim 1 wherein said bottom housing portion is cylindrical, said upper housing portion includes both a lower cylindrical portion which is releasably secured to said open upper end of said bottom housing portion, and an upper end which is conical shaped, said conical shaped end includes said aperture which releasably secures a free end of said support stick holder with a tight fit.

3. The combination as set forth in claim 2 wherein said open upper end of said bottom housing and said cylindrical portion of said upper housing portion includes mating threads so that said upper housing portion can be screw threaded onto said upper open end of said bottom housing portion.

4. The combination as set forth in claim 1 wherein said edible flavored powder includes a fine granular mixture of a plurality of flavors.

5. The combination as set forth in claim 1 wherein said edible powder is of one flavor which is different from said candy sucker.

6. The combination as set forth in claim 1 wherein said edible powder comprises a plurality of different fine granular candy substances separated from each other.

* * * * *

UNITED STATES PATENT AND TRADEMARK OFFICE
Certificate

Patent No. 5,370,884

Patented: December 6, 1994

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Thomas J. Coleman, Bristol, VA; Princess Ann Coleman, Bristol, VA; and Ann M. Schlotter, Stafford, VA.

Signed and Sealed this Twenty-second Day of April 2003.

MARIAN C. KNODE
*Supervisory Patent Examiner*
Art Unit 3653

UNITED STATES PATENT AND TRADEMARK OFFICE
Certificate

Patent No. 5,370,884                                         Patented: December 6, 1994

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Thomas J. Coleman, Bristol, VA; William K. Schlotter, IV, Stafford, VA; Princess Ann Coleman, Bristol, VA; and Ann M. Schlotter, Stafford, VA.

Signed and Sealed this Ninth Day of September 2003.

*MARTIN C. KNODE*
*Supervisory Patent Examiner*
*Art Unit 1700*

UNITED STATES PATENT AND TRADEMARK OFFICE
Certificate

Patent No. 5,370,884　　　　　　　　　　　　　　　　　　　　Patented: December 6, 1994

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Thomas J. Coleman, Bristol, VA; William K. Schlotter, IV, Stafford, VA; and Am M. Schlotter, Stafford, VA.

Signed and Sealed this Seventh Day of October 2003.

MARIAN C. KNODE
*Supervisory Patent Examiner*
Art Unit 1700